US009834267B1

(12) United States Patent (10) Patent No.: US 9,834,267 B1
Hanagan (45) Date of Patent: Dec. 5, 2017

(54) REDUCING WIND RESISTANCE OF A VEHICLE

(71) Applicant: Michael W. Hanagan, Hollister, CA (US)

(72) Inventor: Michael W. Hanagan, Hollister, CA (US)

(*) Notice: Subject to any disclaimer, the term of this patent is extended or adjusted under 35 U.S.C. 154(b) by 0 days.

(21) Appl. No.: 15/188,664

(22) Filed: Jun. 21, 2016

Related U.S. Application Data

(63) Continuation of application No. 14/855,254, filed on Sep. 15, 2015, now Pat. No. 9,394,011.

(51) Int. Cl.
*B62D 35/00* (2006.01)
*B62J 17/00* (2006.01)

(52) U.S. Cl.
CPC .................... *B62J 17/00* (2013.01)

(58) Field of Classification Search
CPC ................ B62J 17/00; B62D 35/00
See application file for complete search history.

(56) References Cited

U.S. PATENT DOCUMENTS

| 4,284,302 | A | * | 8/1981 | Drews | B62D 35/00 |
| | | | | | 152/523 |
| 4,776,535 | A | * | 10/1988 | Paterson | B62D 35/00 |
| | | | | | 138/37 |
| 4,789,117 | A | * | 12/1988 | Paterson | B62D 35/00 |
| | | | | | 138/37 |
| 5,289,997 | A | * | 3/1994 | Harris | B62D 35/001 |
| | | | | | 102/501 |
| D445,398 | S | * | 7/2001 | Hanagan | D12/410 |
| D479,185 | S | * | 9/2003 | Hanagan | D12/410 |
| 7,810,867 | B2 | * | 10/2010 | Salaverry | B62D 35/00 |
| | | | | | 296/180.1 |
| D677,196 | S | * | 3/2013 | Salaverry | D12/181 |
| 8,579,360 | B2 | * | 11/2013 | Litchfield | G06F 12/0246 |
| | | | | | 296/180.1 |
| D704,112 | S | * | 5/2014 | Salaverry | D12/181 |
| 2006/0066132 | A1 | * | 3/2006 | Page | B62D 35/00 |
| | | | | | 296/181.1 |
| 2010/0090496 | A1 | | 4/2010 | Carlson | |
| 2012/0261945 | A1 | | 10/2012 | Litchfield | |

* cited by examiner

*Primary Examiner* — Lori L Lyjak
(74) *Attorney, Agent, or Firm* — Heimlich Law, PC; Alan Heimlich, Esq.

(57) ABSTRACT

By strategically placing a series of turbulators on a surface of a vehicle the aerodynamic drag on the vehicle is less than the vehicle without such turbulators. The turbulators change a laminar flow to a turbulent flow at a point before laminar flow separation from the vehicle without such turbulators.

9 Claims, 7 Drawing Sheets

DESCRIPTIONS:

102 Outline of Vehicle

104 Laminar Boundary Layer

106 Turbulent Boundary Layer

108 Eddy Currents

110 Turbulators, Dimples

112 High Velocity Impact

DESCRIPTIONS:

102 Outline of Vehicle ——————————

104 Laminar Boundary Layer ——————

106 Turbulent Boundary Layer

108 Eddy Currents

110 Turbulators, Dimples

112 High Velocity Impact

REDUCING WIND RESISTANCE OF A VEHICLE

RELATED APPLICATION

The present Application for Patent claims priority to U.S. patent application Ser. No. 14/855,254 titled "Reducing Wind Resistance of a Vehicle" filed Sep. 15, 2015, pending, and which is hereby incorporated fully herein by reference.

FIELD OF THE INVENTION

The present invention relates to wind resistance. More particularly, the present invention relates to Reducing Wind Resistance of a Vehicle.

BACKGROUND OF THE INVENTION

Wind (also known as air or aerodynamic) resistance (also called drag) is required to be overcome to move a vehicle through the air. For example, if the vehicle is a car then aerodynamic drag requires energy to propel the car through the air. This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

Reducing Wind Resistance of a Vehicle is disclosed.

For illustration purposes the invention will be described with respect to a vehicle being an electric car, however the invention is not so limited and the techniques disclosed may be practiced on other vehicles and using other propulsion systems (e.g. gasoline motorcycle, etc., boats, planes, trains, etc.). Nor are the techniques discussed limited to air, for example, the techniques disclosed may be applied to watercraft, etc.

In one embodiment of the invention an electric car, has features, such as, but not limited to, dimples strategically placed on the car body (e.g. electric car body) to aid in reducing aerodynamic drag.

In one embodiment of the invention a reduction in aerodynamic drag will reduce the amount of energy required to propel the car which may be particularly beneficial for an electric car. Savings of energy bring economic value and increased range per charge.

There are two types of air flow around objects, LAMINAR BOUNDARY LAYER and TURBULENT BOUNDARY LAYER.

LAMINAR Air Flow has less drag, but is prone to a phenomenon called "separation".

TURBULENT Air Flow has more surface drag initially, but also offers better adhesion and therefore is less prone to separation.

In one embodiment of the invention, dimples on an electric car body act as turbulators, introducing turbulent air flow.

In one embodiment of the invention, the electric car body is shaped in such a way as to hold the Laminar Line flowing against the body, as long as possible before separation.

In one embodiment of the invention, Dimples are strategically placed to turbulate the air flow, causing some additional surface drag, but prolonging separation therefore reducing eddy currents.

In one embodiment of the invention, it is better to turbulate the boundary layer (at a slight increase in drag) in order to increase adhesion and reduce eddies (which means a significant reduction in drag).

In one embodiment of the invention, the electric car is named a Sparrow. In one embodiment of the invention, the Sparrow Electric Car body maximizes the advantages of both Laminar and Turbulent Air flow characteristics.

In one embodiment of the invention, the body is smooth and receptive to smooth laminar flow, in the front of the car.

In one embodiment of the invention, at the areas where separation starts, dimple turbulators are designed in to turbulate Laminar flow and turn it into Turbulent flow.

In one embodiment of the invention, air flow contours to the rear of the car better, which makes for a much smaller wake, the smaller wake pulls back less on the rear of car.

Primary Drag is created by the wake, by dimpling the Sparrow in critical areas, eddies are lessened, lessening the net aerodynamic drag on the car, increasing total vehicle efficiency.

Figure 1:
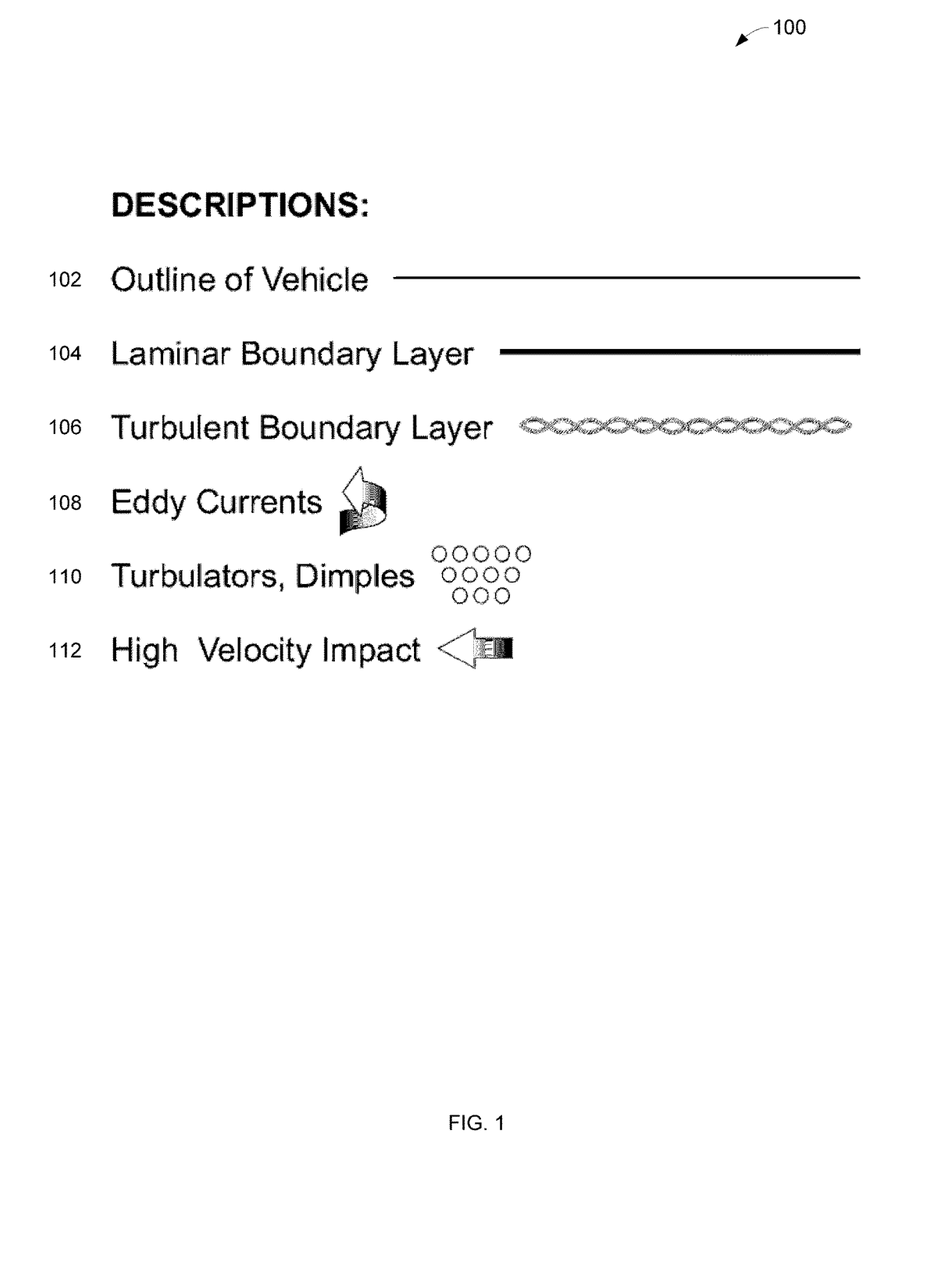
FIG. 1 illustrates descriptions for use in the figures.

FIG. 1 shows, generally at 100, descriptions that are of assistance in viewing some of the other figures. At 102 is the Outline of Vehicle. At 104 is Laminar Boundary Layer. At 106 is Turbulent Boundary Layer. At 108 is Eddy Currents. At 110 are Turbulators, in this example Dimples. At 112 is High Velocity Impact.

Figure 2:
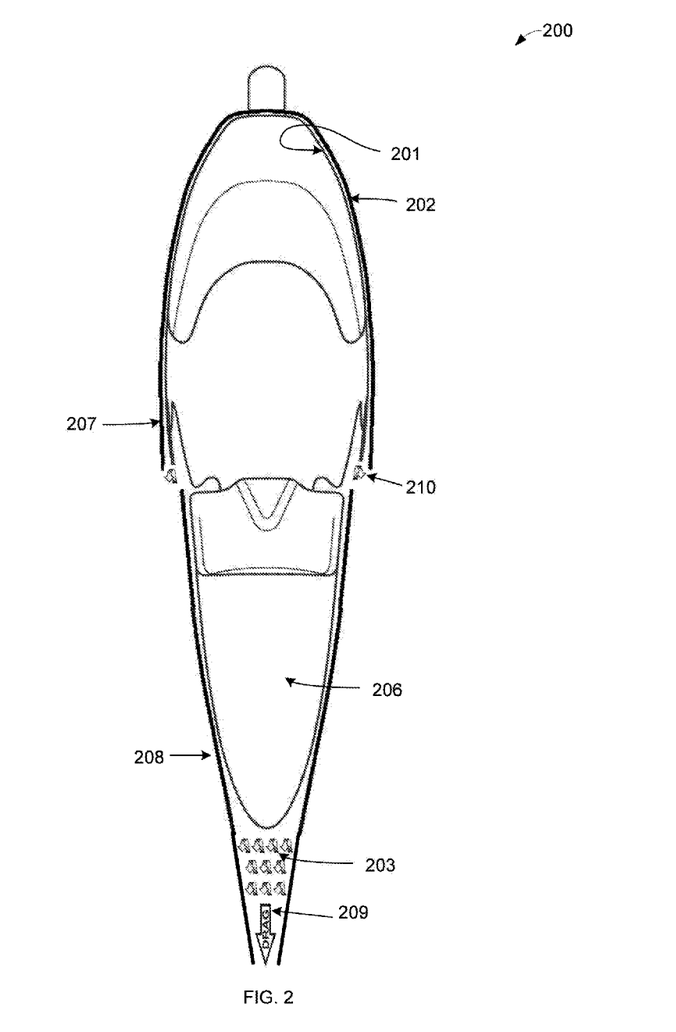
FIG. 2 illustrates a top view of a vehicle without turbulators.

FIG. 2 shows, generally at 200, a top view of a vehicle (motorcycle) without the current embodiments. At 201 is line of the motorcycle body. At 202 is a laminar boundary layer. At 203 are eddy currents. At 206 is a rear cowling on the motorcycle. At 207 is shown separation from the front fender point. At 208 is shown separation from the rear of the motorcycle point. At 209 is shown a drag area. At 210 are shown large eddies behind the front fender. As can be seen in FIG. 2 at 202 is laminar boundary layer contouring to the motorcycle body. At 207 is a point of the boundary layer separation as is point 208. At 210 is an area of large strong eddy currents behind front fenders (210 on right as shown and same of left side—not denoted). At 203 is a large area of strong eddies causing drag 209 on the rear of the car.

Figure 3:
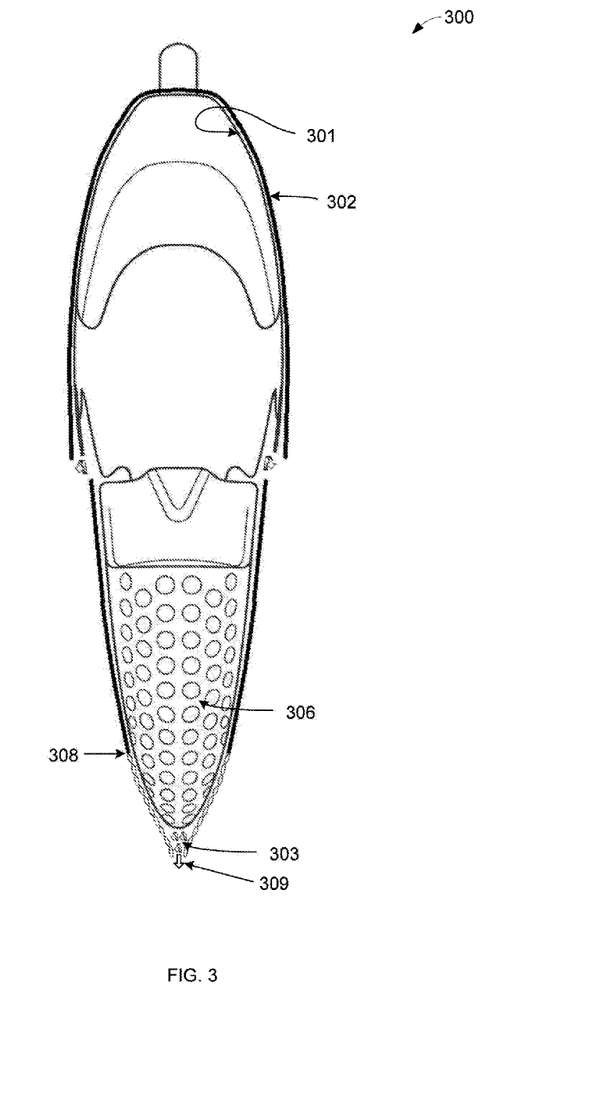
FIG. 3 illustrates one embodiment of the invention showing a top view with turbulators.

FIG. 3 illustrates, generally at 300, embodiments of the invention showing a top view of a vehicle (motorcycle). At 301 is line of the motorcycle body. At 302 is a laminar boundary layer. At 303 are reduced eddy currents (compared to FIG. 2 at 203). At 306 is a rear cowling on the motorcycle now with illustrated turbulators in the form of dimples. At 308 is shown separation from the rear of the motorcycle point now showing a turbulent boundary layer from point 308 rearward. At 309 is shown a reduced drag (as compared with FIG. 2 at 209). The reduced eddies current area and drag of FIG. 3 at 303 and 309 can be seen compared to the larger eddies area and drag of FIG. 2 at 203 and 209.

Figure 4:
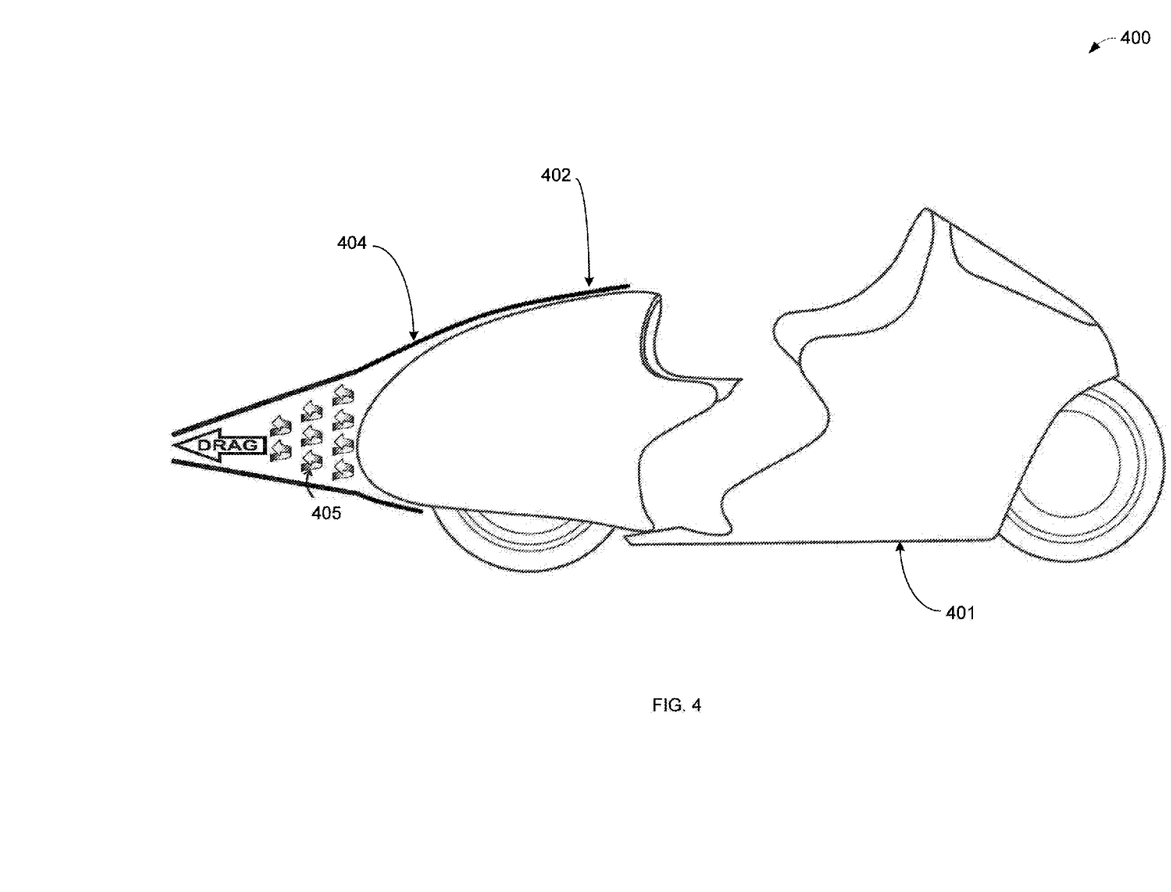
FIG. 4 illustrates a side view of a vehicle without turbulators.

FIG. 4 shows, generally at 400, a side view of a vehicle (motorcycle) without the current embodiments. At 401 is line of the car body. At 402 is a laminar boundary layer following the motorcycle contour. At 404 is the laminar boundary layer separation. At 405 is a large area of eddy currents causing a large drag on the motorcycle.

Figure 5:
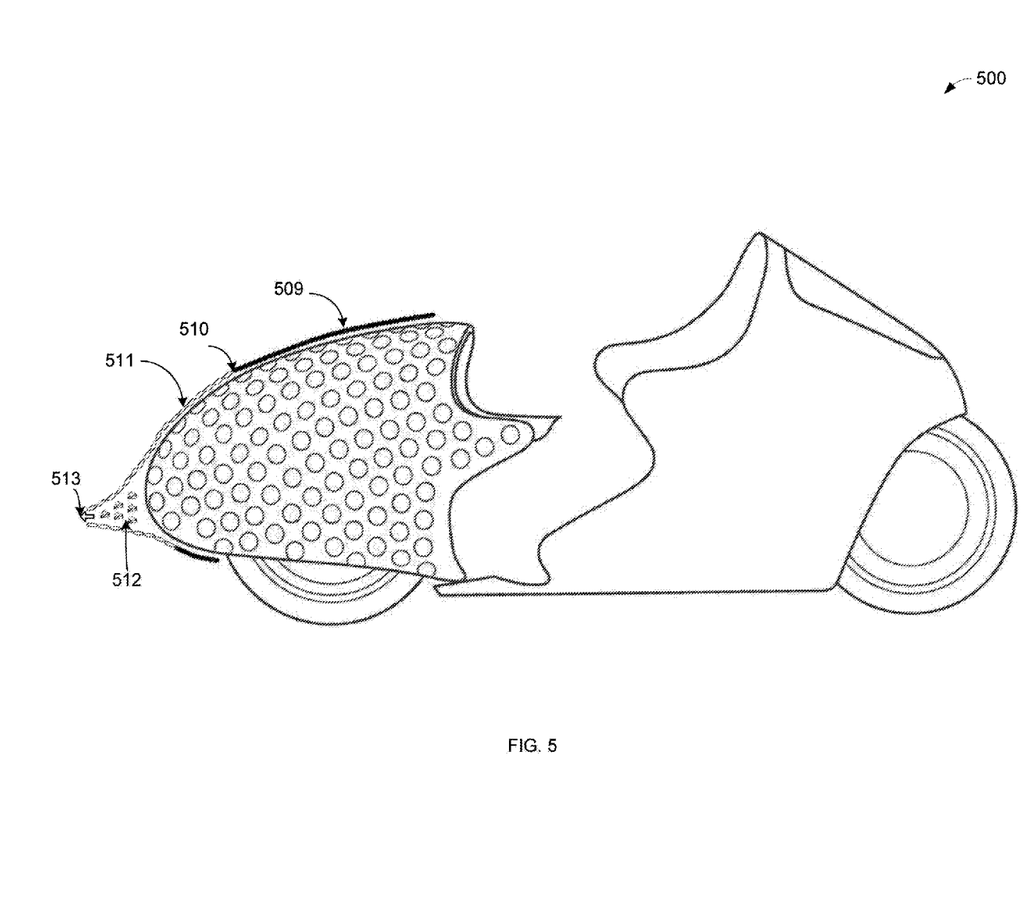
FIG. 5 illustrates one embodiment of the invention showing a side view with turbulators.

FIG. 5 illustrates, generally at 500, embodiments of the invention showing a side view of a vehicle (motorcycle). At 509 is laminar boundary layer on the top of the rear cowling of the motorcycle. At 510 is a point where the laminar boundary layer is turbulated by, as illustrated in this embodiment, dimples and changes into a turbulated boundary layer 511. The turbulated boundary layer 511 contours to the shape of the motorcycle. At 512 is a small pocket of eddy currents (compared to FIG. 4 at 405) which lessens the amount of drag 513 on forward motion of the motorcycle (compared to FIG. 4).

In one embodiment of the invention the turbulators are designed to introduce into the spatial frequency of the motorcycle without the turbulators higher wavenumbers.

Wavenumber is defined to be: $k=2\pi/\lambda$, where k is the wavenumber, $\pi=3.14159$, and $\lambda$ is the wavelength. By taking a spatial Fourier transform (e.g. FFT (fast Fourier transform), DFT (discrete Fourier transform)) of the motorcycle, for example, longitudinally from front to rear as in the side view of FIG. 4 the vehicle and air flow can be modeled as shape energy with a spatial frequency wavenumber k.

Figure 6:
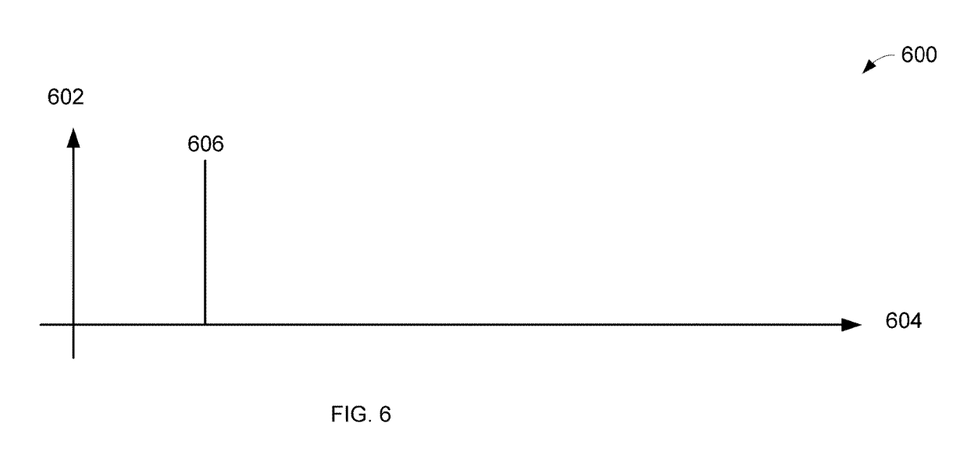
FIG. 6 illustrates a spatial frequency wavenumber without turbulators.

FIG. 6 shows, generally at 600, shape energy along the Y axis 602 and the wavenumber k along the X axis 604. The intersection of the X and Y axis is origin 0, 0. At 606 is illustrated the lowest fundamental wavenumber for a motorcycle without turbulators.

Figure 7:
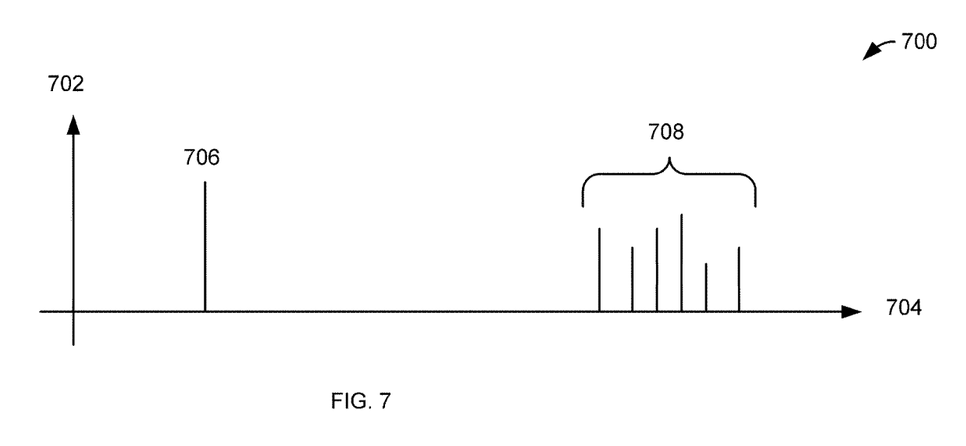
FIG. 7 illustrates a spatial frequency wavenumber with turbulators.

FIG. 7 shows, generally at 700, shape energy along the Y axis 702 and the wavenumber k along the X axis 704. The intersection of the X and Y axis is origin 0, 0. At 706 is illustrated the lowest fundamental wavenumber for a motorcycle with turbulators and the spectral for turbulators 708 on said motorcycle. What is to be appreciated is that the higher spectral frequencies are introduced by the turbulators and that the lower wavenumber spatial energy of the motorcycle fundamental spatial frequency is lowered.

The wavenumber of the turbulators is higher than the wavenumber of the surface on which it is now a part. That is the base vehicle wavenumber is lower that the wavenumber of the turbulators.

The turbulators have been illustrated as dimples but the invention is not so limited. The turbulators may be circular in nature, oval, elliptical, irregular, hexagonal, and in fact not only depressions but rise above the surface on to which they are a feature. That is in the vernacular, bumps.

Figure 8:
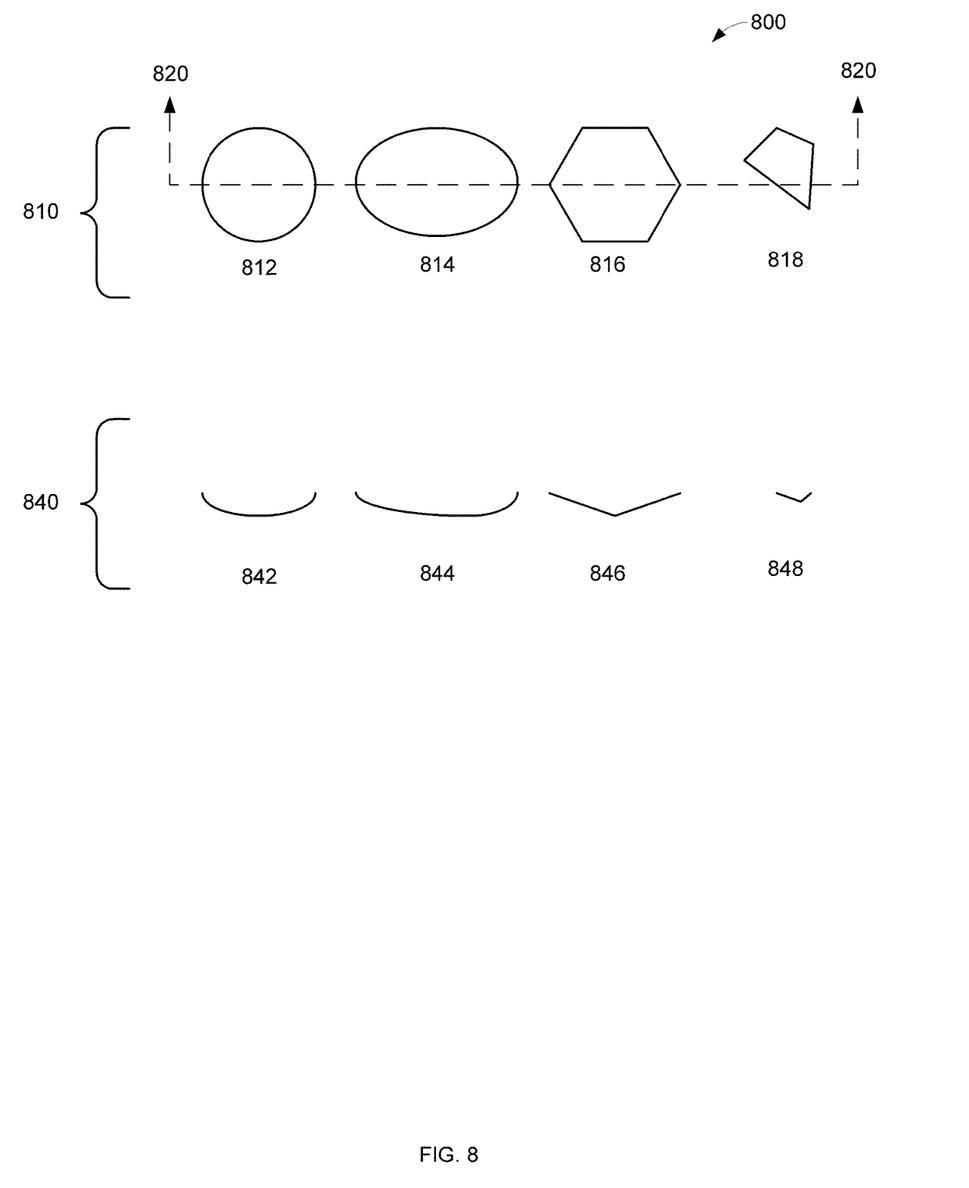
FIG. 8 illustrates various embodiments of the invention.

FIG. 8 illustrates, generally at 800, a variety of turbulators. At 810 are top views of circular 812, oval (ellipse) 814, hexagonal 816, and polygonal 818 surface indentations. At 840 are shown side views along section 820, of circular 842, oval 844, hexagonal 846, and polygonal 848 surface indentations Nor is the invention limited to a single sized or type of turbulator. For example, in one embodiment, the dimples follow a gradient path of air flow and get smaller and closer together towards a rear of a vehicle.

What is to be appreciated is that based on the aerodynamic drag on a surface, converting laminar airflow into turbulent air flow at specific locations can reduce the overall aerodynamic drag of a vehicle on which the surface resides.

Further the turbulators in whatever form need not cause lift. For example, dimples without causing lift. And such dimples may be on the car without the car flying through the air.

Thus Reducing Wind Resistance of a Vehicle has been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

It is to be understood that various terms and techniques are used by those knowledgeable in the art to describe implementations, mechanisms, etc. One such technique is the description of an implementation of a technique in terms of an algorithm or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in hardware.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus Reducing Wind Resistance of a Vehicle has been described.

What is claimed is:

1. A structure imparted in a motorcycle surface, said motorcycle surface integral to a motorcycle, said structure imparted having a wavenumber greater than a wavenumber of said motorcycle surface, and wherein said structure moves a separation point from a laminar flow to a turbulent flow forwards along said motorcycle.

2. The structure of claim 1 wherein said greater than is ten times or greater.

3. The structure of claim 1 wherein said structure is one or more dimples.

4. The structure of claim 1 wherein said structure is a closed polygonal surface indentation.

5. The structure of claim 1 wherein said structure has a hexagonal circumference.

6. The structure of claim 1 wherein said structure is located in a rear cowling of said motorcycle.

7. The structure of claim 1 wherein said structure is located in a back of said motorcycle.

8. The structure of claim 1 wherein said structure is located in a fairing of said motorcycle.

9. The structure of claim 3 wherein said structure is located in a fairing of said motorcycle.

\* \* \* \* \*